United States Patent
Roberge

(10) Patent No.: US 8,028,505 B1
(45) Date of Patent: Oct. 4, 2011

(54) TELESCOPING FLAIL MOWER AND METHOD OF OPERATION

(75) Inventor: Martin J. Roberge, Saskatoon (CA)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/869,239

(22) Filed: Aug. 26, 2010

(51) Int. Cl.
*A01D 34/00* (2006.01)

(52) U.S. Cl. ......................................................... 56/13.5

(58) Field of Classification Search ................. 56/328.1, 56/295, 400, 364, 13.5; 198/693, 613
See application file for complete search history.

(56) References Cited

U.S. PATENT DOCUMENTS

| | | | |
|---|---|---|---|
| 73,914 A | 1/1868 | Moul | |
| 1,245,168 A | 11/1917 | Wright | |
| 2,696,706 A * | 12/1954 | Getsinger | 56/330 |
| 2,701,634 A * | 2/1955 | Carroll | 198/518 |
| 3,126,693 A * | 3/1964 | Renn | 56/364 |
| 3,175,829 A | 3/1965 | Ferris | |
| 3,323,196 A * | 6/1967 | Renn | 492/33 |
| 3,332,219 A | 7/1967 | Lundell | |
| 3,478,500 A * | 11/1969 | Rhoads | 56/16.4 R |
| 3,949,539 A | 4/1976 | Cartner | |
| 4,189,907 A * | 2/1980 | Erdman | 56/400 |
| 4,595,421 A * | 6/1986 | Redhead et al. | 134/6 |
| 5,099,635 A | 3/1992 | Butkovich et al. | |
| 5,134,837 A * | 8/1992 | Casey et al. | 56/12.8 |
| 6,182,427 B1 | 2/2001 | Loehr | |
| 7,238,113 B2 | 7/2007 | Lukac | |
| 7,543,433 B2 | 6/2009 | Hironimus | |
| 7,596,935 B2 | 10/2009 | Bollinger et al. | |
| 2008/0098705 A1* | 5/2008 | Salley et al. | 56/16.4 R |
| 2009/0217639 A1* | 9/2009 | Lohrentz | 56/364 |

\* cited by examiner

*Primary Examiner* — Arpad Fabian-Kovacs
(74) *Attorney, Agent, or Firm* — Patrick M. Sheldrake; Michael G. Harms

(57) ABSTRACT

A foldable mower includes a telescoping flail conditioning system. The telescoping flail conditioning system includes a first tube having a first set of tines, a second tube having a second set of tines, and a first arrangement of corresponding slots extending through at least a portion of the first tube and configured to permit the second set of tines to extend substantially radially out of the first tube upon at least a portion of the second tube being positioned within the first tube.

20 Claims, 9 Drawing Sheets

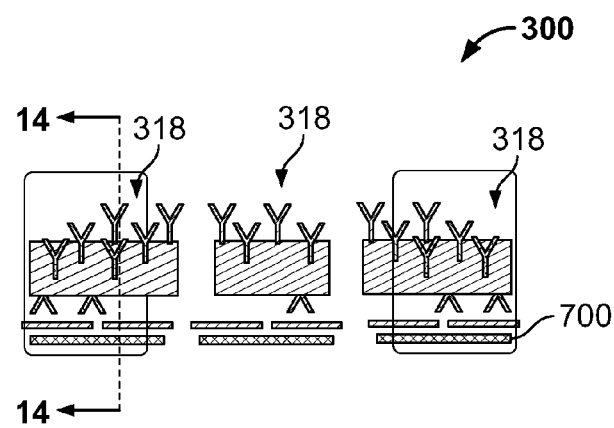
FIG. 10
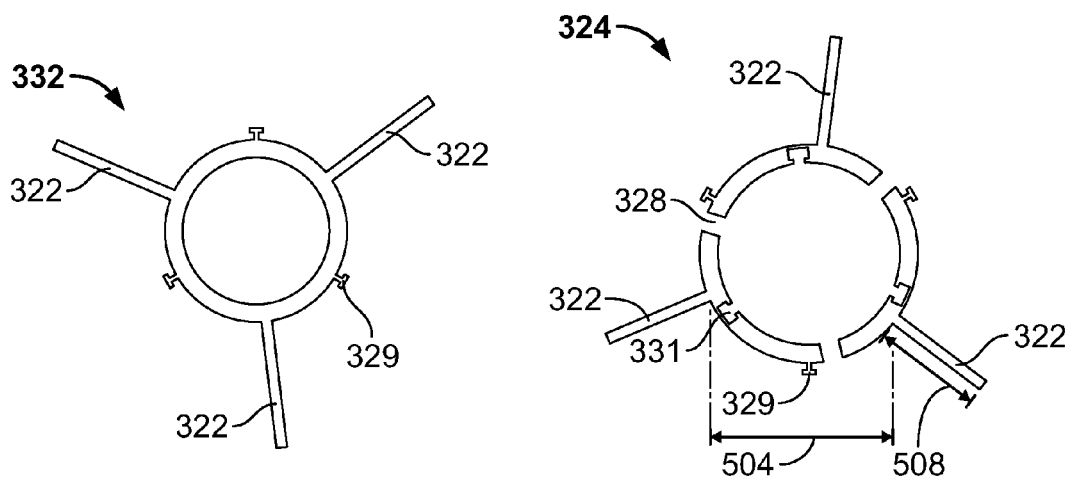
FIG. 11
FIG. 12

TELESCOPING FLAIL MOWER AND METHOD OF OPERATION

FIELD OF THE INVENTION

The present invention relates to agricultural machines and a method of operating agricultural machines. Specifically, the present invention relates to a foldable disc mower and a method of collapsing a foldable disc mower.

BACKGROUND OF THE INVENTION

Agricultural machines are used in a wide range of areas. Many of these areas include natural obstructions such as trees, roadways, hills, and/or waterways that prevent use of an agricultural machine greater than a predetermined width.

In U.S. Pat. No. 7,543,433, to Hironimus, which is incorporated by reference in its entirety, an agricultural machine having a frontal working mower and lateral working mowers is shown. The lateral working mowers are capable of being vertically and hydraulically positioned along the machine to permit passage through narrow regions during a transport operational mode. The machine suffers from the drawback that a powerful hydraulic arm is required to raise the mower. Raising and/or lowering of the mower can damage the mower by jostling, bouncing, and/or improperly orienting component parts. For example, discs, tines, motors, and/or gear boxes can be damaged by raising and/or lowering of a mower. Alternatively, additional supports must be implemented into the mower to prevent such damage. Such additional supports can add weight to the system, thereby reducing efficiency, and adding additional manufacturing costs.

What is needed is an agricultural machine and method of operating an agricultural machine operable over a wide range of areas that does not require a powerful hydraulic arm for transport operation for vertical lifting, and does not suffer from the drawbacks of known machines and methods.

SUMMARY OF THE INVENTION

One aspect of the present disclosure includes a telescoping flail conditioning system for a foldable mower. The system includes a first tube having a first set of tines, a second tube having a second set of tines, and a first arrangement of corresponding slots extending through at least a portion of the first tube and configured to permit the second set of tines to extend substantially radially out of the first tube upon at least a portion of the second tube being positioned within the first tube.

Another aspect of the present disclosure includes a foldable mower. The foldable mower includes a first set of discs, a second set of discs, and a telescoping flail conditioning system. The system includes a first tube having a first set of tines, a second tube having a second set of tines, and a first arrangement of corresponding slots extending through at least a portion of the first tube and configured to permit the second set of tines to extend substantially radially out of the first tube upon at least a portion of the second tube being at least partially positioned within the first tube.

Another aspect of the present disclosure includes a method of operating a foldable mower. The method includes providing a foldable mower and pivoting the first set of discs and the second set of discs of the foldable mower from a cutting position to a transport position.

One advantage of the present disclosure includes maintenance of driver visibility while travelling through narrow obstacles without having a view obstructed by vertically oriented folded discbars.

Another advantage of the present disclosure includes the reduction or elimination of damage to component parts of the mower by consolidating the mower without vertically lifting the mower thereby reducing hydraulics.

Another advantage of the present disclosure includes extending usable life and reduced necessary maintenance of component parts due to jostling, bouncing, and/or improperly orienting being reduced or eliminated in comparison to the jostling, bouncing, and/or improperly orienting associated with vertical lifting of the mower.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 10 shows a schematic top view of interior portions of a mower of an exemplary agricultural machine having a collapsed telescoping drive shaft according to an embodiment of the disclosure.

FIG. 11 shows a sectional view of an inner tube of the telescoping drive shaft in FIG. 9 along line 11-11.

FIG. 12 shows a sectional view of a middle tube of the telescoping drive shaft in FIG. 9 along line 12-12.

DETAILED DESCRIPTION OF THE INVENTION

Provided is an agricultural machine including a foldable disc mower and a method of operating an agricultural machine including a collapsing of a foldable disc mower. Embodiments of the present disclosure facilitate driver visibility, permit the reduction or elimination of damage to component parts of the mower resulting from consolidation of the mower, and/or extend usable life and reduced necessary maintenance of component parts due to jostling, bouncing, and/or improperly orienting being reduced or eliminated.

Figure 1:
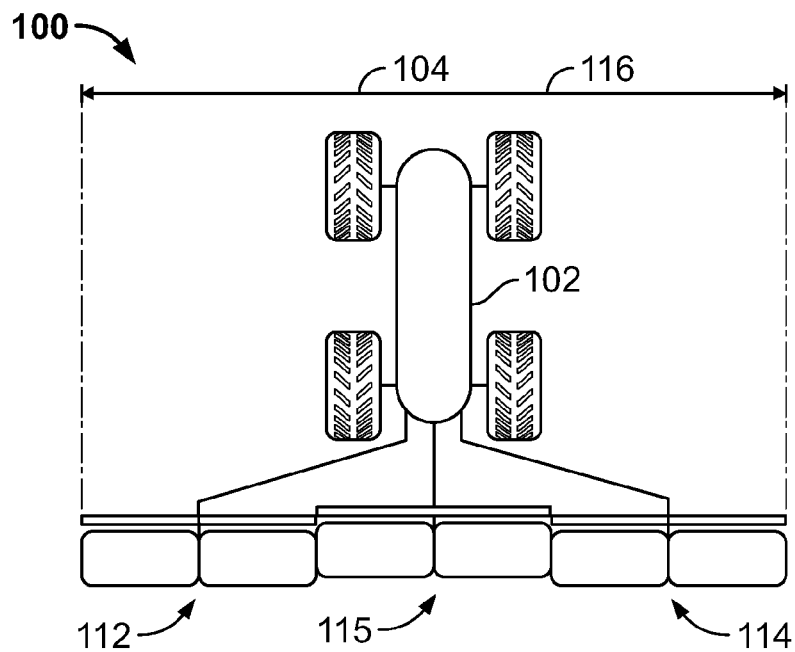
FIG. 1 shows a schematic top view of an exemplary agricultural machine having three expanded frontal mower in an operational mode according to an embodiment of the disclosure.

FIG. 1 shows a schematic top view of an exemplary agricultural machine 100. The agricultural machine 100 can include a vehicle 102 and one or more foldable mowers. The vehicle 102 can be any suitable vehicle having power sufficient for moving the foldable mower(s). For example, the vehicle 102 can be a tractor or a windrower. In the embodiment shown in FIG. 1, the agricultural machine 100 includes a first frontal mower 112 (shown expanded), a second expanded frontal mower 114 (shown expanded), and a third frontal mower 115 (shown expanded) or a central frontal mower in an operational mode.

Figure 2:
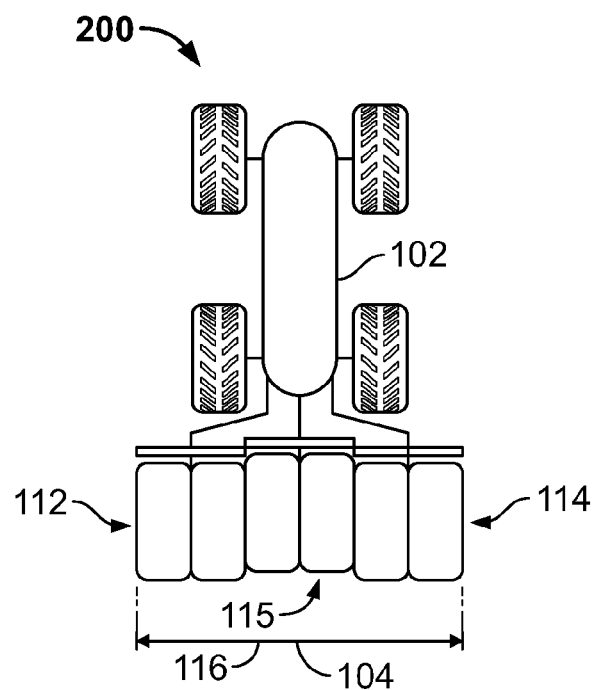
FIG. 2 shows a schematic top view of an exemplary collapsed and retracted agricultural machine having three collapsed frontal mowers according to an embodiment of the disclosure.

In the embodiment shown in FIG. 1, the agricultural machine 100 includes a width 116 defined by a distance between an outer portion of the first frontal mower 112 and the second frontal mower 114. As shown in FIG. 2, which shows a schematic top view of a collapsed and retracted agricultural machine 200 having three collapsed frontal mowers, the width 116 is a collapsed width that is shorter than the width 116 of the agricultural machine 100 in FIG. 1. The agricultural machine 200 can be formed by collapsing one or more of the frontal mower 112 (shown collapsed in FIG. 2), the second frontal mower 114 (shown collapsed in FIG. 2), and the third frontal mower 115 (shown collapsed in FIG. 2). The collapsed agricultural machine 200 can be in a transit mode instead of an operational mode. Additionally or alternatively, one or more of the mowers can be retracted to be positioned closer to the vehicle 102. For example, as shown in the embodiments in FIGS. 1 and 2, the first frontal mower 112 and the second frontal mower 114 can be retracted from the position in FIG. 1 to the position in FIG. 2. As will be appreciated by those skilled in the art, one or more mower may be repositioned by any other suitable additional mechanism. For example, in addition to the mechanisms shown herein, one or more mower may be repositioned by lifting all or a portion of one or more mower in a vertical or partially vertical orientation and/or by sliding horizontally (for example, under the vehicle 102).

The agricultural machine 100 also includes a width profile 104 defined by a region occupied by the vehicle 102 and the foldable mower(s). Specifically, the width profile 104 is a region occupied by the vehicle 102 and the foldable mower(s) at a predetermined elevation (for example, from just above the ground to about 3 feet above the ground). The width profile 104 can be contiguous (see FIGS. 1-2 and 5) or it can be non-contiguous (see FIGS. 3-4). In the embodiments shown in FIGS. 1-2, the width profile 104 is the same as the width 116.

In FIGS. 1-2, the width profile 104 is formed by the first frontal mower 112, the second frontal mower 114, and the third frontal mower 115 (which is positioned in FIG. 1 in front of the entire vehicle 102). In one embodiment, each expanded foldable mower has a width of about 3.45 m (about 136 inches). Thus, the width 116 and the width profile 104 of the agricultural machine 100 can be about 10.35 m (about 407 inches). In a further embodiment, each collapsed foldable mower has a width of about 1.15 m (about 45 inches). Thus, the width 116 and the width profile 104 of the collapsed and retracted agricultural machine 200 can be about 3.45 m (about 135 inches). As will be appreciated by those skilled in the art, the mower may be adjusted to be larger or smaller to meet regulatory requirements (for example, maximum road widths), to correspond with vehicle and/or tire sizes or positions (for example, being located between tires so that a crop can go through the mower without hitting the tire), or in any other suitable position.

Figure 3:
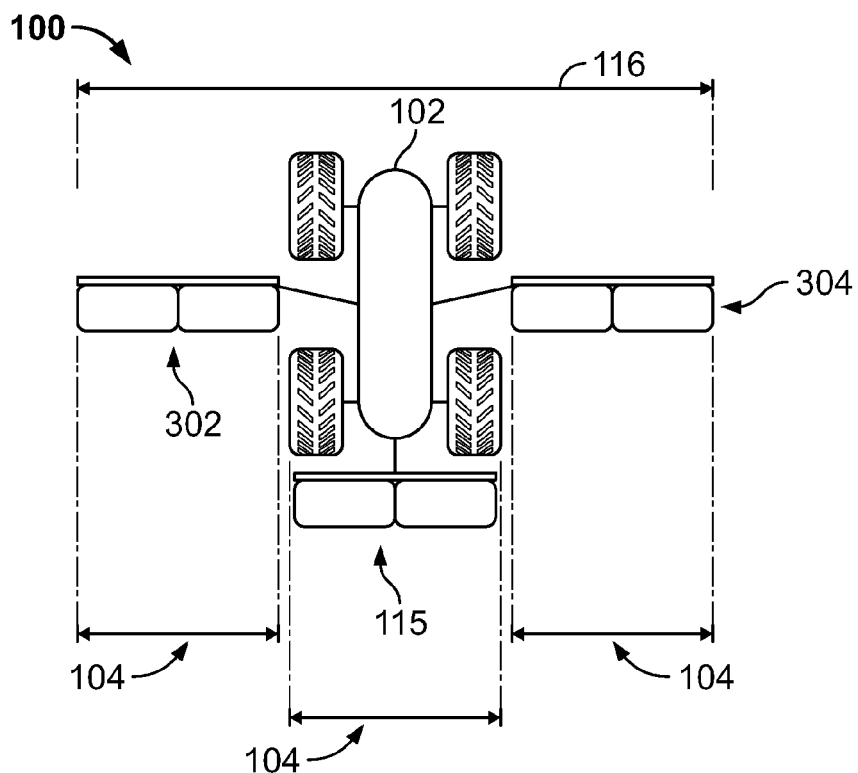
FIG. 3 shows a schematic top view of an exemplary agricultural machine having one expanded frontal mower and two expanded lateral mowers according to an embodiment of the disclosure.

FIG. 3 shows a schematic top view of the agricultural machine 100 having one expanded frontal mower and two expanded lateral mowers according to an embodiment of the disclosure. One or more of the lateral mowers shown can be a pull-type mower. In the embodiment shown in FIG. 3, the agricultural machine 100 includes the third frontal mower 115 (shown expanded in FIG. 3), a first lateral mower 302 (shown expanded in FIG. 3), and a second lateral mower 304 (shown expanded in FIG. 3) in an operational mode. In the embodiment shown in FIG. 3, the agricultural machine 100 includes a width 116 defined by a distance between an outer portion of the first lateral mower 302 and the second lateral mower 304. In addition, the agricultural machine includes a width profile 104 defined by the region in front of the first lateral mower 302, the second lateral mower 304, the third frontal mower 115, and the vehicle 102 (including wheels of the vehicle).

Figure 4:
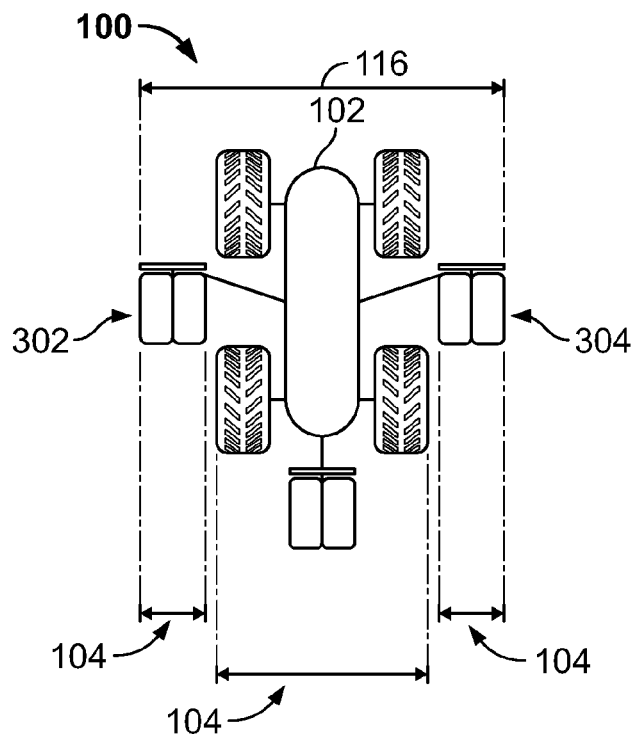
FIG. 4 shows a schematic top view of an exemplary collapsed agricultural machine having one collapsed frontal mower and two collapsed lateral mowers according to an embodiment of the disclosure.

As shown in FIG. 4, which shows a schematic top view of an embodiment of a collapsed agricultural machine 400 having one collapsed frontal mower and two collapsed lateral mowers (the first lateral mower 302, the second lateral mower 304, and the third frontal mower 115), the width 116 can be decreased (in comparison to the width 116 of the agricultural machine 100 of FIG. 3) by collapsing one or more of the first lateral mower 302 and the second lateral mower 304. In this embodiment, the collapsed agricultural machine 400 can be in a transit mode instead of an operational mode. Additionally or alternatively, the collapsing can form a width profile 104 that is smaller (in comparison to the width profile 104 agricultural machine 100 of FIG. 3).

Figure 5:
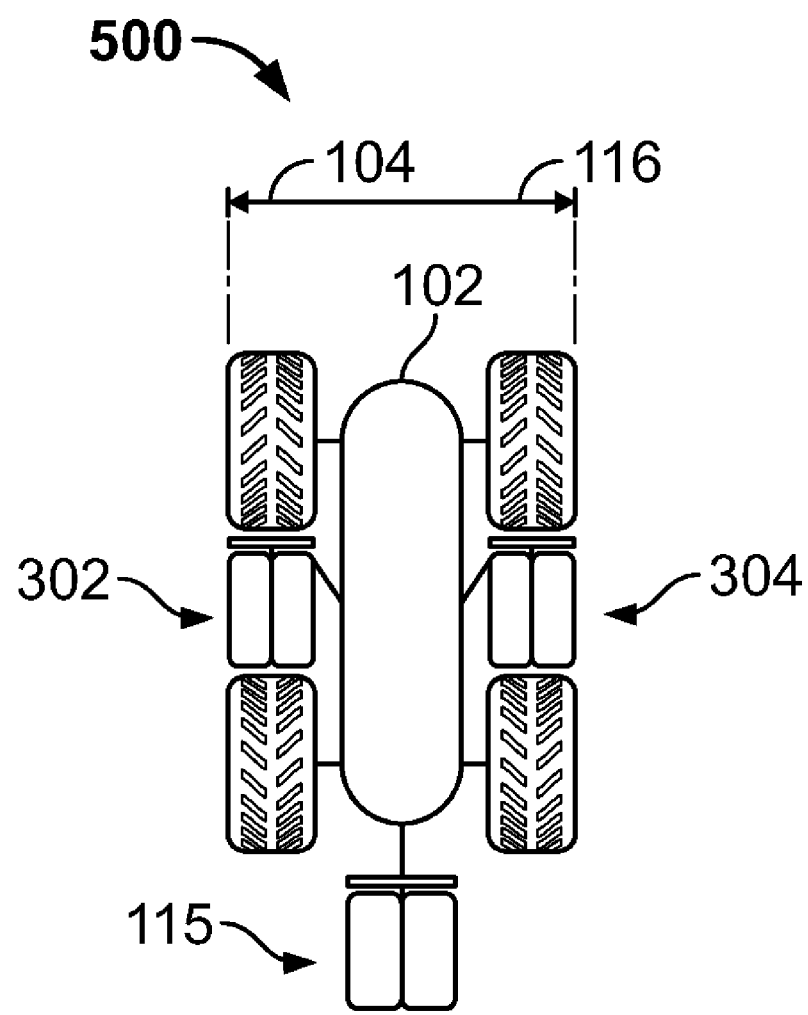
FIG. 5 shows a schematic top view of an exemplary collapsed and retracted agricultural machine having one collapsed frontal mower and two collapsed lateral mowers repositioned adjacent a vehicle according to an embodiment of the disclosure.

As shown in FIG. 5, which shows a schematic top view of an embodiment of a collapsed and retracted agricultural machine 500 having one collapsed frontal mower (the third frontal mower 115) and two collapsed lateral mowers (the first lateral mower 302 and the second lateral mower 304) retracted to be adjacent to the vehicle 102. In this embodiment, the collapsed and retracted agricultural machine 500 can be in a transit mode instead of an operational mode. In this embodiment, the retracting forms a shorter the width 116 (in comparison to the width 116 of the collapsed agricultural machine 400 of FIG. 4) and a shorter width profile 104 (in comparison to the width profile 104 of the collapsed agricultural machine 400 of FIG. 4).

Figure 6:
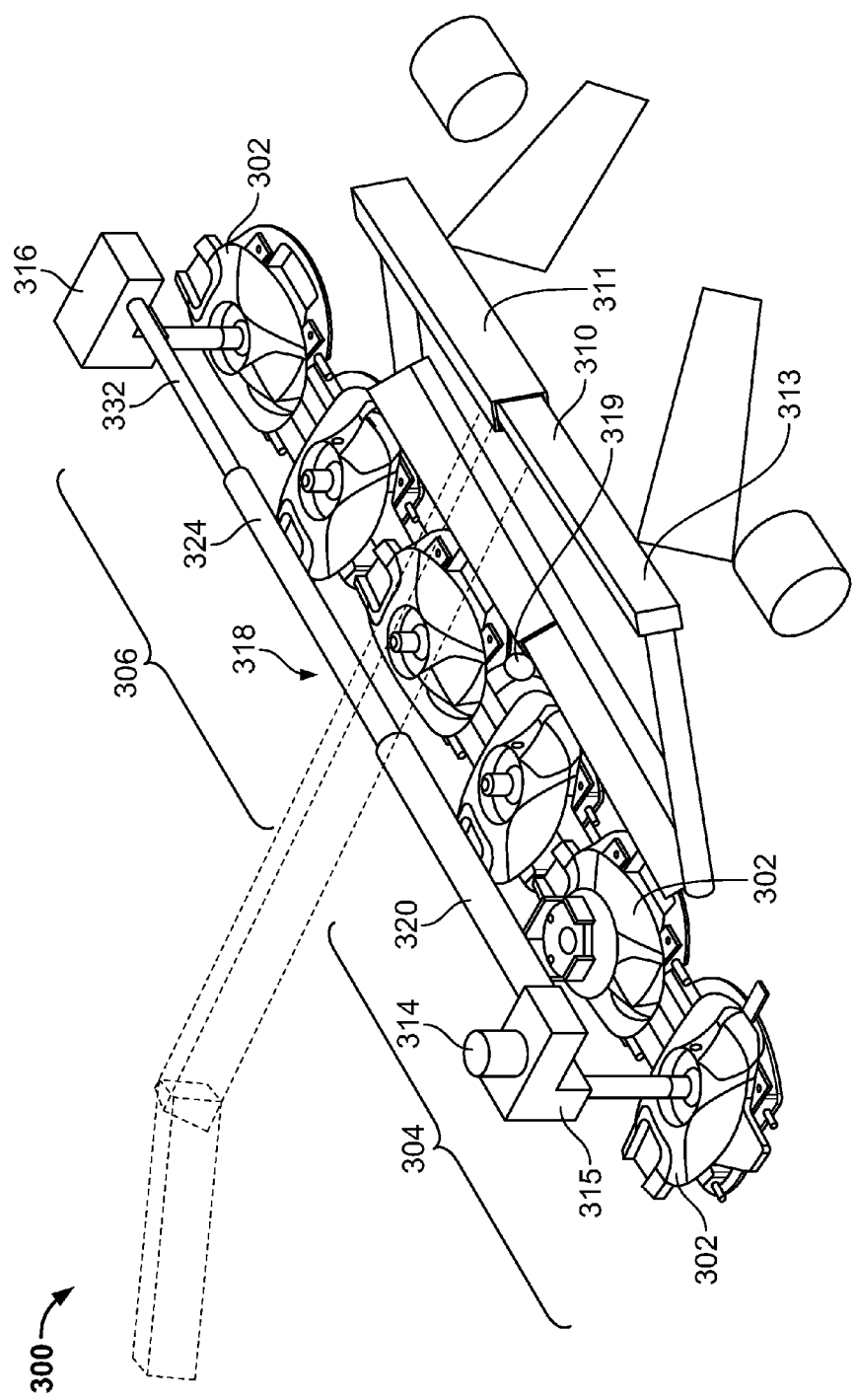
FIG. 6 shows a schematic perspective view of an interior of a mower of an exemplary agricultural machine having two sets of discs and an expanded telescoping drive shaft according to an embodiment of the disclosure.

FIG. 6 shows a schematic perspective view of an interior of a mower 300 of the agricultural machine 100 having two sets of cutters or discs 302 and an expanded telescoping drive shaft 318 in an operational mode according to an embodiment. The foldable mower 300 includes the discs 302 arranged as a first set 304, discs 302 arranged as a second set 306, and the telescoping drive shaft 318. The foldable mower 300 can further include a frame 310, a shielding (for example, a tarp), a motor 314, and a gear box 316. The frame 310 can be positioned along the first set 304 of discs 302 and the second set 306 of discs 302 with one or more hinges 319 that can be actuated to permit selective adjustment of the orientation of the first set 304 in relation to the second set 306. The frame 310 can further include features for collapsing the frame 310 (for example, the frame 310 can be formed at least partially by a hollow member 311 capable of sliding over another member 313). The shielding (not shown) can be positioned along the frame 310 and prevent rain or other debris from interfering with the operation of the discs 302. The motor 314 can be operably connected to the first set 304 of discs 302. The gear box 316 can be operably connected to the motor 314 by the telescoping drive shaft 318 and the second set 306 of discs 302. As will be appreciated, the frame can be extended to have additional members permitting the mower to be a wide mower. Additionally or alternatively, the motor 314 can be hydraulically operated or operated based upon mechanical input (for example, from a power take-off or PTO shaft).

The discs 302 can be any suitable discs collectively forming a disc cutter assembly. The discs 302 can be rotatably connected to the foldable mower 300 (for example, to the frame 310 and/or to other discs 302 connected to the frame 310). In one embodiment, the discs 302 rotate to cut standing crop (for example, grass, alfalfa, clover, etc.), condition the grass inside the flail system and create a windrow in the rear. Force for the rotation can be provided by the motor 314 and/or the gear box 316. In one embodiment, the motor 314 drives the first set 304 of discs 302, the motor 314 drives the gear box 316, and the gear box 316 drives the second set 306 of discs 302. The discs 302 can include independent drive gears (not shown), spur gears (not shown), interconnected shafts (not shown), bearings (not shown), or any other suitable gears or bearings for rotationally coupling the disc to the motor 314, the gear box 316, and/or other discs 302. Each disc 302 can be positioned with a predetermined relationship in comparison to adjacent discs. For example, in one embodiment, a first disc is oriented perpendicular to a second adjacent disc. This orientation permits the first disc and the second disc to be positioned at closer distance thereby permitting additional cutting of the harvest. In one embodiment, two adjacent discs are positioned such that a combined width of the two discs installed in the mower is less than twice the width of each disc. In one embodiment, the discs 302 can be configured to rotate in the same direction or in opposite directions.

Figure 7:
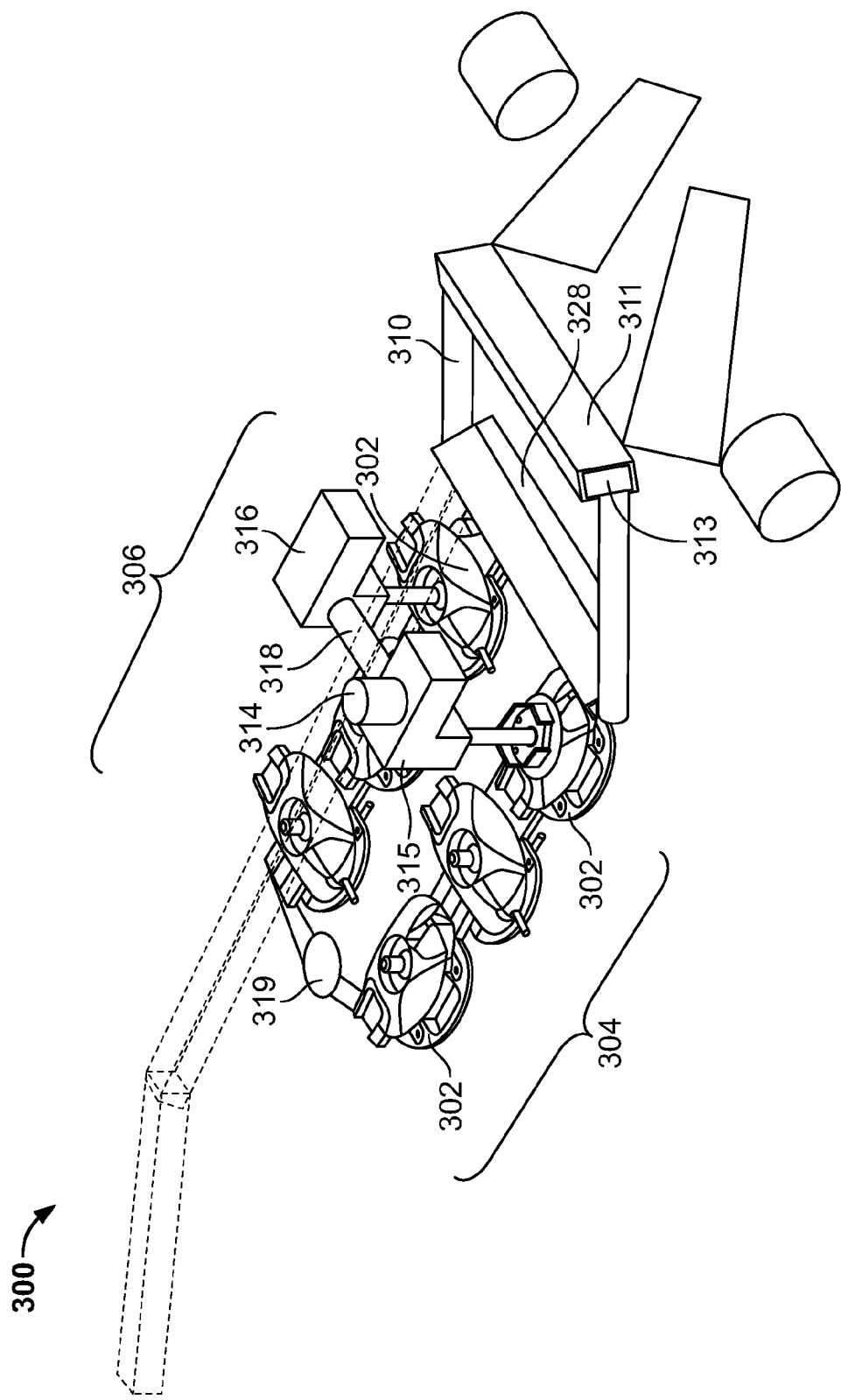
FIG. 7 shows a schematic perspective view of an interior of a mower of an exemplary agricultural machine having two sets of discs and an collapsed telescoping drive shaft according to an embodiment of the disclosure.

In the cutting position shown in FIG. 6, the first set 304 of discs 302 and the second set 306 of discs 302 are substantially aligned (i.e., forming a line) in an operational mode. FIG. 7 shows a schematic perspective view of the interior of the mower 300 in a collapsed or transport mode. In the transport mode, the first set 304 of discs 302 and the second set 306 of discs 302 form two separate lines. As shown, the two separate lines are parallel. However, in other embodiments, the two separate lines can be arranged in a "V" shape (facing either way), an "L" shape (facing any way), or any other suitable orientation. The first set 304 of discs 302 and/or the second set 306 of discs 302 can be pivoted from the cutting position to the transport position.

The telescoping drive shaft 318 permits the foldable mower 300 (and thus the agricultural machine 100) to be collapsed from a cutting position to a transport position. The collapsing can decrease the width and/or the width profile as discussed above. In the cutting position (the extended position), the telescoping drive shaft 318 rotates the first tube 320 (for example, an outer tube) and/or the second tube 324 (for example, a middle tube or an inner tube) for cutting. The telescoping drive shaft 318 is configured to permit the pivoting of the first set 304 of discs 302 and the second set 306 of discs 302. In permitting this pivoting, the telescoping drive shaft 318 synchronizes sections to prevent discs 302, knives, or other portions of the mower from interfering with the pivot.

Figure 8:
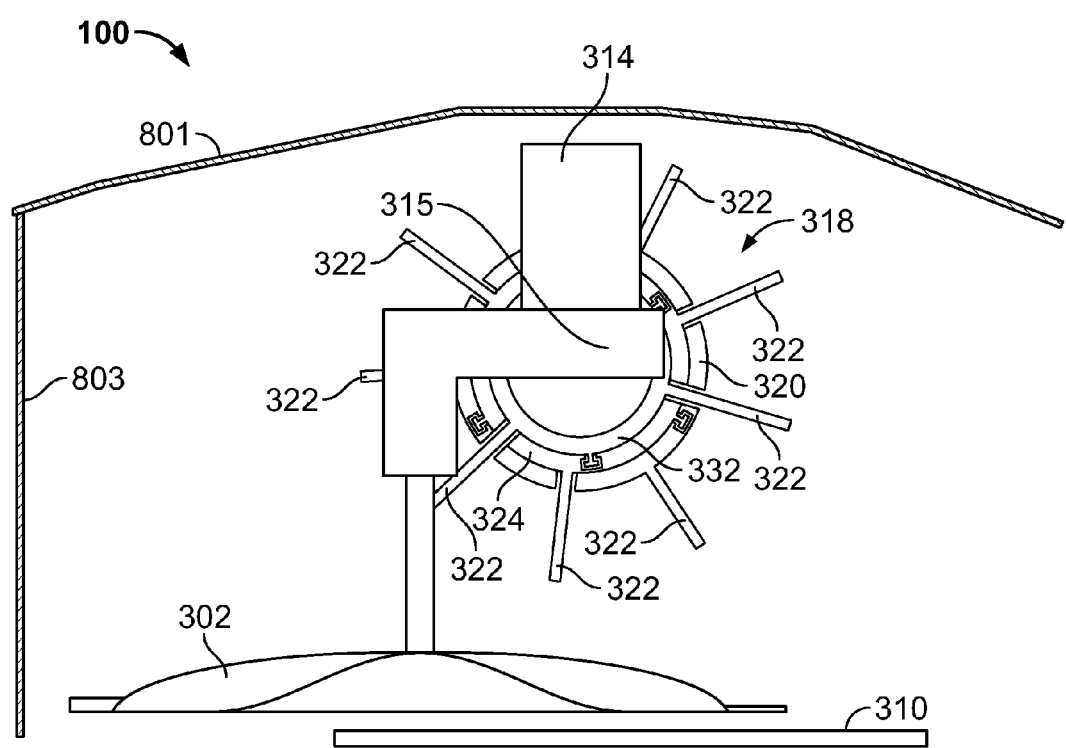
FIG. 8 shows a schematic side view of an interior of a mower of an exemplary agricultural machine having two sets of discs and an extended telescoping drive shaft according to an embodiment of the disclosure.

FIG. 8 shows a schematic side view of an interior of the mower 300 according to an embodiment. As shown in FIG. 8, the mower 300 can include a housing 801 providing a counter-surface for conditioning and/or a flexible skirt 803 providing safety. As shown in FIG. 8, the motor 314 in the mower 300 can be a hydraulic motor and can be operably connected to the discs 302 by a second gearbox 315 in operational communication with the gearbox 316 through the telescoping drive shaft 318.

Figure 9:
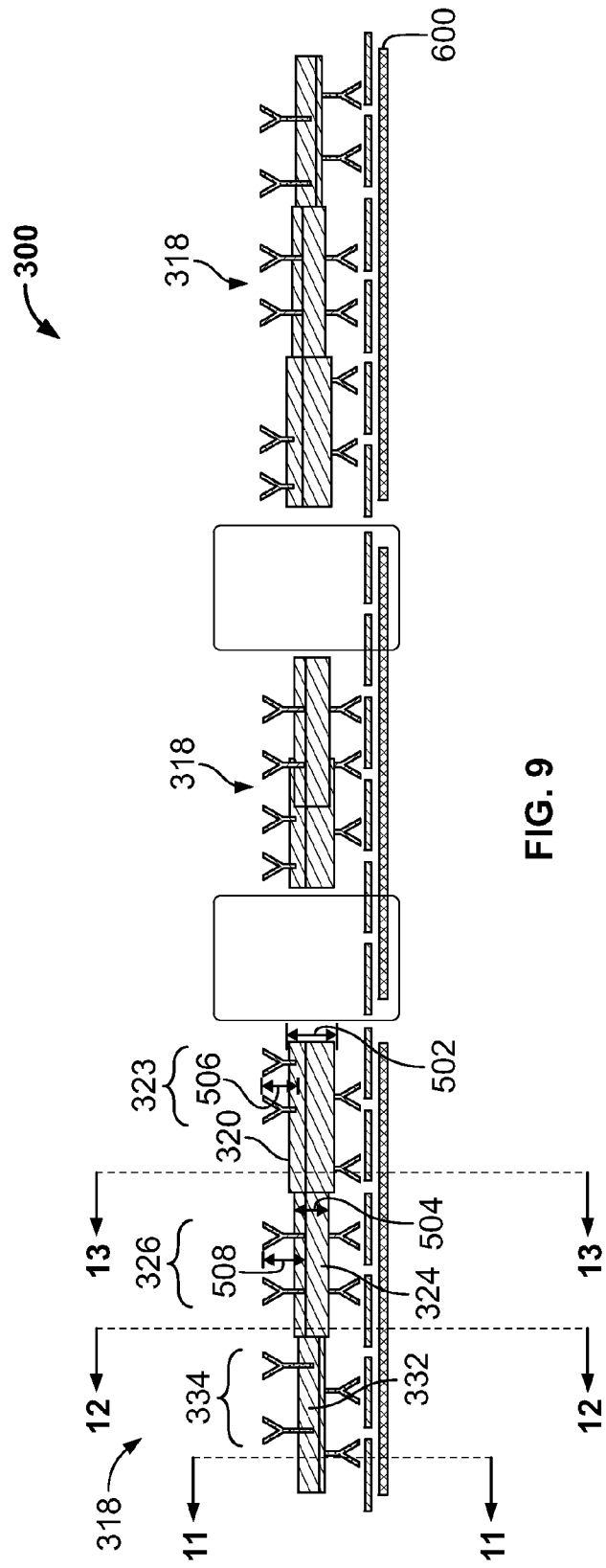
FIG. 9 shows a schematic top view of interior portions of a mower of an exemplary agricultural machine having an extended telescoping drive shaft according to an embodiment of the disclosure.
Figure 13:
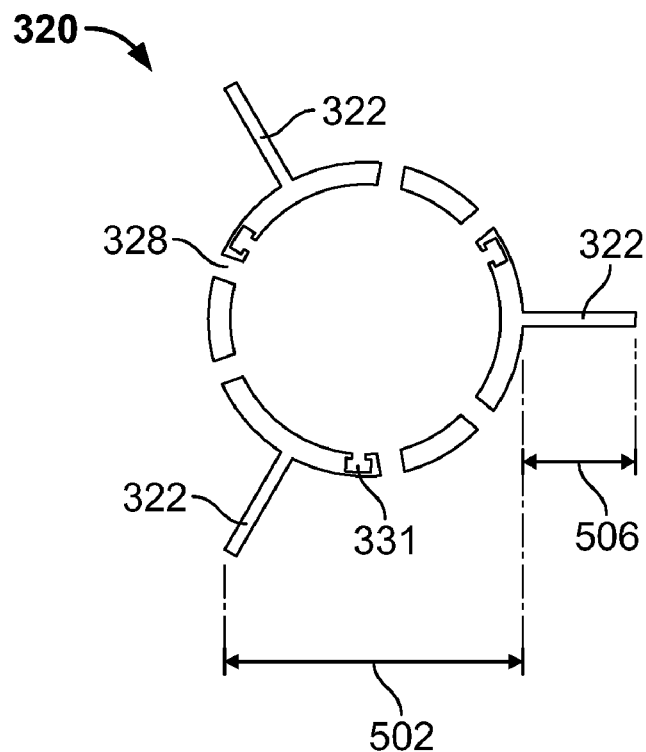
FIG. 13 shows a sectional view of a outer tube of the telescoping drive shaft in FIG. 9 along line 13-13.
Figure 14:
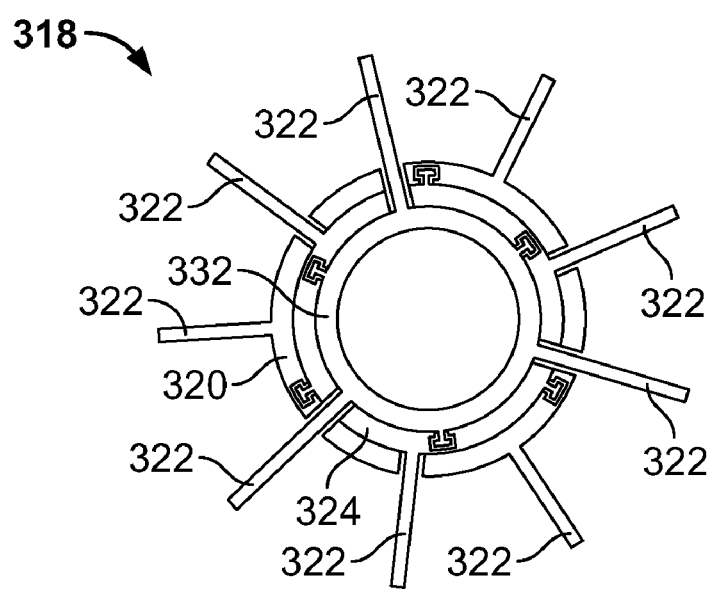
FIG. 14 shows a sectional view of a first tube, a second tube, and a third tube of the telescoping drive shaft in FIG. 10 along line 14-14.

FIGS. 9 through 14 show various views of the telescoping drive shaft 318 or portions of the telescoping drive shaft 318 for the foldable mower 300. Specifically, FIG. 9 shows a schematic top view of interior portions of the mower 300 having three extended telescoping drive shafts 318 according to an embodiment. FIG. 10 shows the mower of FIG. 9 with the telescoping drive shafts 318 collapsed. FIGS. 11-13 show cross-sectional views along the extended telescoping drive shaft 318 in FIG. 9. FIG. 14 shows a cross-sectional view of the telescoping drive shaft 318 of FIG. 10.

The telescoping drive shaft 318 includes at least a first tube 320 having tines 322 arranged in a first set 323 and a second tube 324 having tines 322 arranged in a second set 326 (see middle telescoping shaft of FIG. 9). The first tube 320 includes an arrangement of corresponding slots 328 (for example, channels, grooves, cut-out regions, etc.) extending through the first tube 320 (see FIGS. 12-13). The slots 328 are configured to permit the second set 326 of tines 322 to extend radially out of the first tube 320 upon the second tube 324 being positioned/inserted inside of or within the first tube 320 (see FIG. 10). The tines 322 can be rigid protrusions secured to a tube. The tines 322 can be metal, plastic, or partially metal and plastic (for example, a welded steel base with a plastic replaceable tip or a metal welded to the tube with an articulation holding a tip). The tines 322 condition the crop by moving it against the housing 801.

In one embodiment, the shaft further includes a third tube 332 (for example, an inner tube) having tines 322 arranged in a third set 334 (see FIG. 9). The second tube 324 includes an arrangement of corresponding slots 328 extending through the second tube 324. These corresponding slots 328 are configured to permit the third set 334 of tines 322 to extend radially out of the second tube 324 upon the third tube 332 being positioned within second tube 324 (see FIG. 14). Additionally, these corresponding slots 328 can extend through the first tube 320 thereby permitting the third set 334 of tines 322 to extend radially out of the first tube 320 upon the third tube 332 being positioned within second tube 324 and the second tube 324 being positioned within the first tube 320.

Referring to FIG. 9, in one embodiment, the first tube 320 has a first diameter 502 and the second tube 324 has a second diameter 504, the first diameter 502 being greater than the second diameter 504 to permit the second tube 324 to slide within the first tube 320. In this embodiment, the first set 323 of tines 322 extends from the first tube 320 and have a first length 506. The second set 326 of tines 322 extend from the second tube 324 and have a second length 508. The first length 506 is less than the second length 508. Nonetheless, the tines 322 form a substantially uniform profile or radial length from a common axis of rotation to provide substantially uniform conditioning. Stated another way, the first diameter 502 plus the first length 506 are substantially equal in length to the second diameter 504 plus the second length 508 thereby forming the substantially uniform cross-section shown in FIG. 14 when collapsed according to FIG. 10. Likewise, the dimensions of the third tube 332 and the tines 322 on the third tube 332 may be configured to form a substantially uniform profile.

Additionally, the first tube 320, the second tube 324, and/or the third tube 332 can include alignment mechanisms. For example, as shown in FIGS. 11 through 14, the third tube 332 can include a protrusion for engaging a channel 331 of the second tube 324. Likewise, the second tube 324 can include a protrusion for engaging the channel of the first tube 320. Along the protrusions and/or channels, a wiper or scraper can be included to prevent harvest material and/or moisture from entering the telescoping drive shaft 318. Additionally or alternatively, gaskets, additional alignment features, and/or other suitable arrangements can be utilized for maintaining the interior of the telescoping drive shaft 318 as substantially isolated from the environment.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A telescoping flail conditioning system for a foldable mower, the system comprising:
   a first tube having a first set of tines;
   a second tube having a second set of tines; and
   a first arrangement of corresponding slots extending through at least a portion of the first tube and configured to permit the second set of tines to extend substantially radially out of the first tube upon at least a portion of the second tube being positioned within the first tube and the first and second tube are telescopically connected such that in a first position the second tube is extendable axially from a position within the first tube and in a second position the second tube is retractable into the first tube.

2. A telescoping flail conditioning system for a foldable mower, the system comprising:
   a first tube having a first set of tines;
   a second tube having a second set of tines;
   a first arrangement of corresponding slots extending through at least a portion of the first tube and configured to permit the second set of tines to extend substantially radially out of the first tube upon at least a portion of the second tube being positioned within the first tube;
   a third tube having a third set of tines; and
   a portion of the second tube and configured to permit the third set of tines to extend substantially radially out of the second tube upon at least a portion of the third tube being positioned within the second tube.

3. The system of claim 1, further comprising an inner shaft positioned within the first tube.

4. The system of claim 3, wherein the inner shaft is configured to rotate the first tube.

5. The system of claim 4, wherein the inner shaft is further configured to rotate the second tube.

6. A foldable mower, comprising:
   a first set of mower cutter discs;
   a second set of mower cutter discs;
   a telescoping flail conditioning system, the system comprising:
   a first tube having a first set of tines;
   a second tube having a second set of tines; and
   a first arrangement of corresponding slots extending through at least a portion of the first tube and configured to permit the second set of tines to extend substantially radially out of the first tube upon at least a portion of the second tube being at least partially positioned within the first tube and the first and second tube are telescopically connected such that a portion of the second tube can be extended axially from within the first tube to a cutting position and the portion is retractable from the cutting position back into the first tube.

7. The foldable mower of claim 6, wherein the first set of discs and the second set of discs can be pivoted to form a transport position.

8. The foldable mower of claim 7, wherein the foldable mower and a vehicle form a width profile perpendicular to a direction of travel of the vehicle, and wherein collapsing to the transport position decreases the width profile.

9. The foldable mower of claim 6, wherein the foldable mower and a vehicle have a combined width perpendicular to a direction of travel of the vehicle, and wherein collapsing to the transport position decreases the combined width.

10. The foldable mower of claim 6, wherein the first set of mower cutter discs and the second set of mower cutter discs are substantially aligned in the cutting position.

11. The foldable mower of claim 6, wherein the telescoping flail conditioning system further comprises:
    a third tube having a third set of tines;
    a second arrangement of corresponding slots extending through at least a portion of the second tube and configured to permit the third set of tines to extend substantially radially out of the second tube upon at least a portion of the third tube being positioned within the second tube.

12. The foldable mower of claim 6, wherein the telescoping drive shaft further comprises an inner shaft positioned within the first tube.

13. The foldable mower of claim 12, wherein the inner shaft is configured to rotate the first tube.

14. The foldable mower of claim 12, wherein the inner shaft is further configured to rotate the second tube.

15. The foldable mower of claim 6, further comprising:
    a motor configured to drive the first set of mower cutter discs;
    a gear box configured to drive the second set of mower cutter discs;
    wherein the motor is rotatably connected with the gear box;
    wherein the motor drives the gear box.

16. The foldable mower of claim 15, wherein the motor is rotatably connected with the gear box by the telescoping drive shaft.

17. The foldable mower of claim 6, wherein:
    the first tube has a first diameter, the second tube has a second diameter, and the first diameter is greater than the second diameter; the first set of tines extending from the first tube have a first length, the second set of tines extending from the second tube have a second length, and the first length is shorter than the second length; and
    a sum of the first diameter and the first length is substantially equal in length to a sum of the second diameter and the second length.

18. A method of operating a foldable mower, the method comprising:

providing a foldable mower, the foldable mower comprising:
a first set of mower cutter discs;
a second set of mower cutter discs;
a telescoping flail conditioning system, the system comprising:
a first tube having a first set of tines;
a second tube having a second set of tines; and
a first arrangement of corresponding slots extending through at least a portion of the first tube and configured to permit the second set of tines to extend substantially radially out of the first tube upon at least a portion of the second tube being at least partially positioned within the first tube and the first and second tube are telescopically connected such that the second tube can be extended from a position within the first tube;

pivoting the first set of discs and the second set of discs from a cutting position to a transport position and reducing the length of the telescoping flail by retracting a portion of the second tube into the first tube.

19. The method of claim 18, wherein the foldable mower and a vehicle form a width profile perpendicular to a direction of travel of the vehicle, and wherein pivoting the first set of discs and the second set of discs decreases the width profile.

20. The method of claim 18, wherein the foldable mower and a vehicle have a combined width, and wherein pivoting the first set of discs and the second set of discs decreases the combined width perpendicular to a direction of travel of the vehicle.

* * * * *